July 2, 1935.  J. S. FORBES ET AL  2,006,712
VALVE OR VALVE FITTING
Filed Jan. 9, 1934
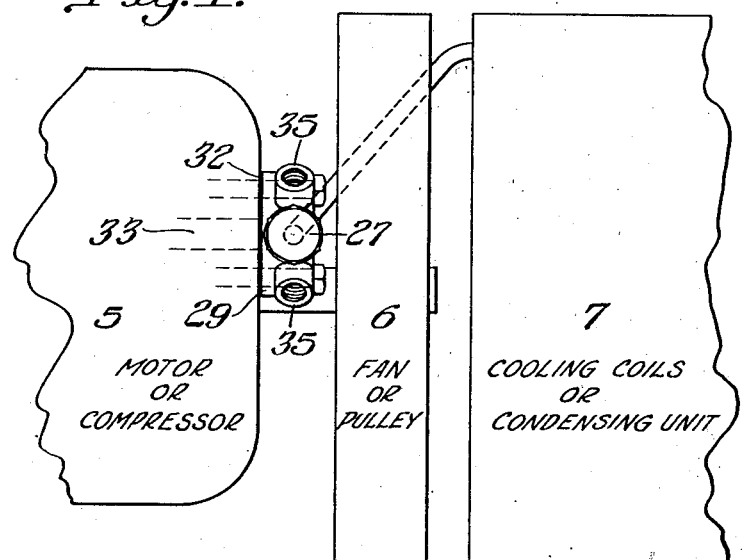
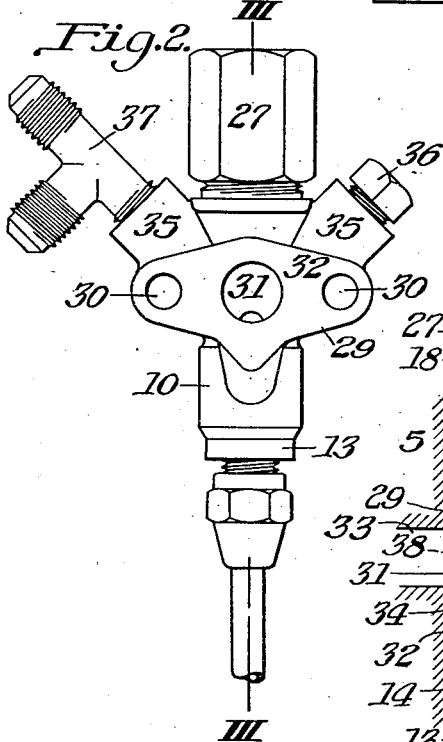
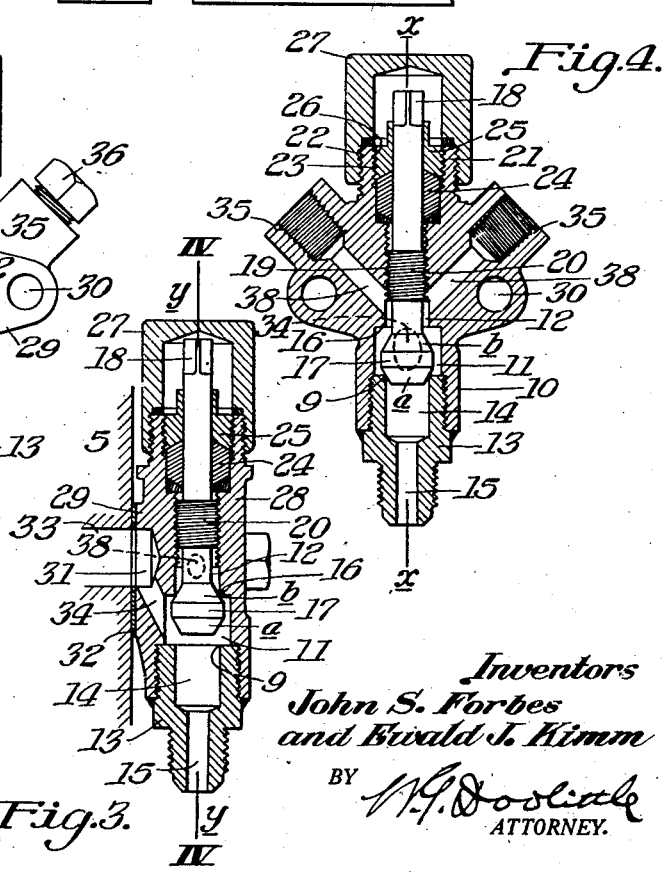
Inventors
John S. Forbes
and Ewald J. Kimm
BY
ATTORNEY.

UNITED STATES PATENT OFFICE 2,006,712

VALVE OR VALVE FITTING

John S. Forbes, Pittsburgh, Pa., and Ewald J. Kimm, Dayton, Ohio., assignors to Kewtest Manufacturing Company, Pittsburgh, Pa., a corporation of Pennsylvania Application January 9, 1934, Serial No. 705,916

4 Claims. (Cl. 251—22)

Our invention relates to valves or valve fittings of the type particularly designed for use in refrigerating apparatus or systems.

This invention contemplates an improved double shut-off valve comprising, in a unitary structure, means for controlling the usual flow of the circulating fluid, means permitting a gage device for pressure readings to be readily connected thereto, and/or a device for charging and exhausting or purging portions of the refrigerating apparatus in a simple and efficient manner.

Due to lack of space and the construction of refrigerating apparatus in which this type of fitting is employed, access to the fitting when it is necessary to attach devices for charging, measuring the pressure of the fluid, etc., has been the source of considerable trouble. One of the prime objects of the present invention is the provision of a fitting very small in structure and of such configuration that it is accessible and may be employed at desired points in the apparatus where it was heretofore impossible to position such fittings, and permit access.

In the accompanying drawing, which illustrates an application of our invention:

Fig. 1 is a diagrammatic top plan of portions of the refrigerating apparatus, showing our invention associated therewith;

Fig. 2, a side elevational view of a fitting embodying the invention;

Fig. 3, a vertical sectional view taken on line III—III of Fig. 2; and

Fig. 4, a vertical sectional view taken on line IV—IV of Fig. 3.

Referring to the diagrammatic view of Fig. 1, 5 designates a motor or compressor of a refrigerating apparatus, 6 a fan or pulley disposed a slight distance from the compressor, and 7 a condensing unit of the refrigerating apparatus.

As illustrated and as preferred, our improved valve or valve fitting includes a casing or housing 10 having therein a valve chamber 11 and an auxiliary chamber 12; and a separable plug 13 having a fluid chamber 14 and a passage 15 leading from the said fluid chamber 14. The plug 13 is also formed with a valve seat 9 located between the chambers 14 and 11, and 16 designates a valve seat disposed between the chamber 11 and the auxiliary chamber 12.

A double shut-off valve 17 having seat-engaging faces $a$ and $b$ is operable in chamber 11, said valve being manipulated therein to effect a seating on either of the seats 9 and 16, and to effect an intermediate position between the two seats by the stem 18 and the cooperating threaded portions 19 and 20 of the casing body and the stem, respectively.

The casing is preferably formed with a centrally disposed vertically extending hollow boss 21 externally threaded at 22 and internally threaded at 23. 24 designates suitable packing and 25 a follower, both located in the hollow boss 21, the follower being formed with threads 26 designed for cooperation with the threads 23. Removably secured to the boss 21 is a cap 27.

As shown, the body 28 of the fitting is circular and is formed with a laterally extending projection or element 29 having portions projecting from opposite sides of the longitudinal axis of the body. Formed in said projection 29 are through openings 30, through which attaching means may be passed for securing the fitting in the desired operative position; for example, to the compressor 5.

In addition to said openings 30, a circular recess or port 31 is formed inwardly of the outer surface of a flat face 32 of element 29, thus dispensing with any projecting elements on the flat face 32, and permitting the fitting to be connected to the compressor in close contact therewith and with port recess 31 in register with a port 33 of the compressor. The said ports 31 and 33 are, when the fitting is positioned, in communication with the valve chamber 11 by an inwardly extending inclined fluid passage 34, the latter being partly formed in the element 29 and partly in the body 28.

A characteristic and important feature of our invention resides in the provision of means for the ready attachment of devices for determining the pressure of the fluid in the refrigerating system and/or charging and exhausting the fluid, of such construction and arrangement on the fitting that the fitting may be positioned relatively to the refrigerating apparatus in a comparatively small space and readily accessible for manipulation.

These means, as illustrated, include one or more internally threaded hollow bosses 35, two being shown, either of which is adapted to receive a connecting member for the pressure gage device, etc., not shown, as well as a plug 36 or a T 37. These bosses 35 extend outwardly from the body and the laterally projecting element 29 in a direction inclined thereto and inclined to the longitudinal axis of the fitting, and the interior of each is in communication with the auxiliary chamber 12 by means of a fluid passage or duct 38.

Attention is called to the fact that these passages 38 are each situated in a vertical plane, indicated by y—y (see Fig. 3) at substantially right angles with the vertical plane x—x (see Fig. 4) in which the passage 34 leading into the valve chamber is located. Further, that the said passages 38 are disposed in a plane substantially parallel with the plane of the flat contacting face 32 of the element 29.

In operation, it will be understood that when the valve is in contact with seat 16 disposed between the valve chamber proper and the auxiliary chamber, fluid under pressure passes from the compressor through recessed port 31 and inclined passage 34 to the valve chamber and from thence into the circulating system through chamber 14 and fluid passage 15 of the plug 13.

When it is desired to take pressure readings, for example, a pressure gage device, not shown, is coupled with one of the hollow bosses 35. After the removal of the plug 36 or the T 37, as the case may be, the cap 27 is removed to permit the manipulation of the valve stem to move the valve from the position of Fig. 3 to a point intermediate the two seats, thus permitting a passage of some fluid from the valve chamber to the auxiliary chamber, and from thence to the gage device by way of one inclined passage 38. After the pressure reading is accomplished, the valve is moved into contact with the seat between the valve chamber and the auxiliary chamber.

If it is desired to charge the apparatus with fluid, a fluid charging device is connected up with the fitting in substantially the same manner as the gaging device was connected, and the valve moved to an intermediate position, as in the operation of reading. It will be apparent that the circulation in the system may be cut off by moving the valve into the position shown by Fig. 4.

We claim:

1. A valve fitting including a casing having a laterally extending attaching element thereon projecting from opposite sides of the longitudinal axis of the casing having a flat contacting face with a fluid port therein, a valve chamber, an auxiliary chamber, and a third chamber therein having a fluid passage therefrom, a plurality of inclined bosses on the casing, a valve seat between the valve chamber and the auxiliary chamber, a valve seat between the valve chamber and the third chamber, a valve operable to engage the seats, means for moving the valve for engaging the seats and to a position intermediate the seats, a fluid passage leading from said fluid port to the valve chamber, and an inclined fluid passage leading from each boss into the auxiliary chamber, said last mentioned passages being in a plane substantially parallel with the contacting face of the attaching element.

2. A valve fitting including a casing having a laterally extending attaching element thereon projecting from opposite sides of the longitudinal axis of the casing having a flat contacting face with a fluid port therein, a valve chamber, an auxiliary chamber, and a separable plug having a chamber therein and a fluid passage therefrom, inclined projecting bosses on the casing, a valve seat between the valve chamber and the auxiliary chamber, a valve seat between the valve chamber and the chamber of the plug, a valve operable to engage the said seats, means for moving the valve for engaging the seats and to a position intermediate the seats, a fluid passage leading from said fluid port to the valve chamber, and an inclined fluid passage leading from each boss into the auxiliary chamber, said inclined passages being in a plane substantially parallel with the plane of the contacting face of the attaching element.

3. A valve fitting including a casing having attaching means thereon including a laterally projecting element having a flat contact face projecting from opposite sides of the longitudinal axis of the casing, a plurality of inclined bosses, a valve chamber, an auxiliary chamber, and a separable plug having a chamber therein and a fluid passage therefrom, a valve seat between the valve chamber and the auxiliary chamber, a valve seat on the plug disposed between the valve chamber and the chamber of the plug, a valve operable to engage the said seats, means for moving the valve for engaging the seats and to a position intermediate the seats, said casing having a fluid inlet port and an inclined fluid passage leading from the port to the valve chamber, and an inclined fluid passage leading from each boss to the auxiliary chamber, said last mentioned passages being disposed in a plane parallel to the plane of the flat contacting face.

4. A valve fitting including a casing having a laterally extending attaching element thereon projecting from opposite sides of the longitudinal axis of the casing having a flat contacting face with a fluid port therein, a valve chamber, an auxiliary chamber, a separable plug formed with a valve seat and provided with a passage extending therethrough, an inclined projecting boss on the casing, a valve seat between the valve chamber and the auxiliary chamber, a valve operable to engage the seat between said chambers and the seat on the plug, means for moving the valve for engaging the seats and to a position intermediate the seats, a fluid passage leading into the valve chamber, and an inclined fluid passage leading from the boss into the auxiliary chamber, said inclined fluid passage being disposed in a plane parallel with the plane of the contacting face of the attaching element.

JOHN S. FORBES.
EWALD J. KIMM.

CERTIFICATE OF CORRECTION.

Patent No. 2,006,712.                                          July 2, 1935.

JOHN S. FORBES, ET AL.

It is hereby certified that the name of the assignee in the above numbered patent was erroneously written and printed as "Kewtest Manufacturing Company" whereas said name should have been written and printed as Kerotest Manufacturing Company, as shown by the records of assignments in this office; and that the said Letters Patent should be read with this correction therein that the same may conform to the record of the case in the Patent Office.

Signed and sealed this 13th day of August, A. D. 1935.

Leslie Frazer (Seal)

Acting Commissioner of Patents.